United States Patent
Klein et al.

(10) Patent No.: US 11,221,759 B2
(45) Date of Patent: Jan. 11, 2022

(54) TRANSITIONS AND OPTIMIZATIONS FOR A FOLDABLE COMPUTING DEVICE OPERATING IN A PRODUCTIVITY MODE

(71) Applicant: MICROSOFT TECHNOLOGY LICENSING, LLC, Redmond, WA (US)

(72) Inventors: Christian Klein, Duvall, WA (US); Ryan Pendlay, Bellevue, WA (US); Peter Hammerquist, Shoreline, WA (US); Julia Christine Carlson, Seattle, WA (US); Christoffer Peter Hart Hansen, Seattle, WA (US); Lauren Edelmeier, Seattle, WA (US); Scott Schenone, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/796,837

(22) Filed: Feb. 20, 2020

(65) Prior Publication Data

US 2021/0096741 A1    Apr. 1, 2021

Related U.S. Application Data

(60) Provisional application No. 62/909,190, filed on Oct. 1, 2019.

(51) Int. Cl.
*G06F 3/0488* (2013.01)
*G06F 3/0482* (2013.01)
*G06F 3/02* (2006.01)

(52) U.S. Cl.
CPC .......... *G06F 3/04886* (2013.01); *G06F 3/021* (2013.01); *G06F 3/0482* (2013.01)

(58) Field of Classification Search
CPC ..... G06F 3/04886; G06F 3/0482; G06F 3/021
See application file for complete search history.

(56) References Cited

U.S. PATENT DOCUMENTS

| 10,254,803 B1* | 4/2019 | Quinn ................. G06F 1/1643 |
| 2013/0086505 A1* | 4/2013 | de Paz ............... G06F 3/04842 |
| | | 715/773 |

(Continued)

OTHER PUBLICATIONS

"International Search Report and Written Opinion Issued in PCT Application No. PCT/US2020/051378", dated Dec. 21, 2020, 12 Pages.

*Primary Examiner* — Sahlu Okebato
(74) *Attorney, Agent, or Firm* — Newport IP, LLC; Jacob P. Rohwer

(57) ABSTRACT

A foldable computing device provides user interface ("UI") transitions and optimizations while operating in a productivity mode. When the foldable computing device is operating in productivity mode, it can present a UI below a hardware keyboard placed over a display region and occluding only a top portion of the display region or a software keyboard presented in the display region occluding only the top portion of the display region. If the hardware keyboard or the software keyboard occlude only the bottom of the display region, a UI can be shown above the hardware keyboard or the software keyboard. The foldable computing device can adjust the position of UI windows that are occluded when the hardware or software keyboard is placed on the display region. The foldable computing device can move the UI windows back to their original positions if the hardware or software keyboard no longer occlude the display region.

18 Claims, 17 Drawing Sheets

(56) References Cited

U.S. PATENT DOCUMENTS

2018/0210515 A1    7/2018  Lyles et al.
2018/0218859 A1*  8/2018  Ligtenberg .............. G06F 1/165
2018/0329580 A1  11/2018  Aurongzeb et al.

* cited by examiner

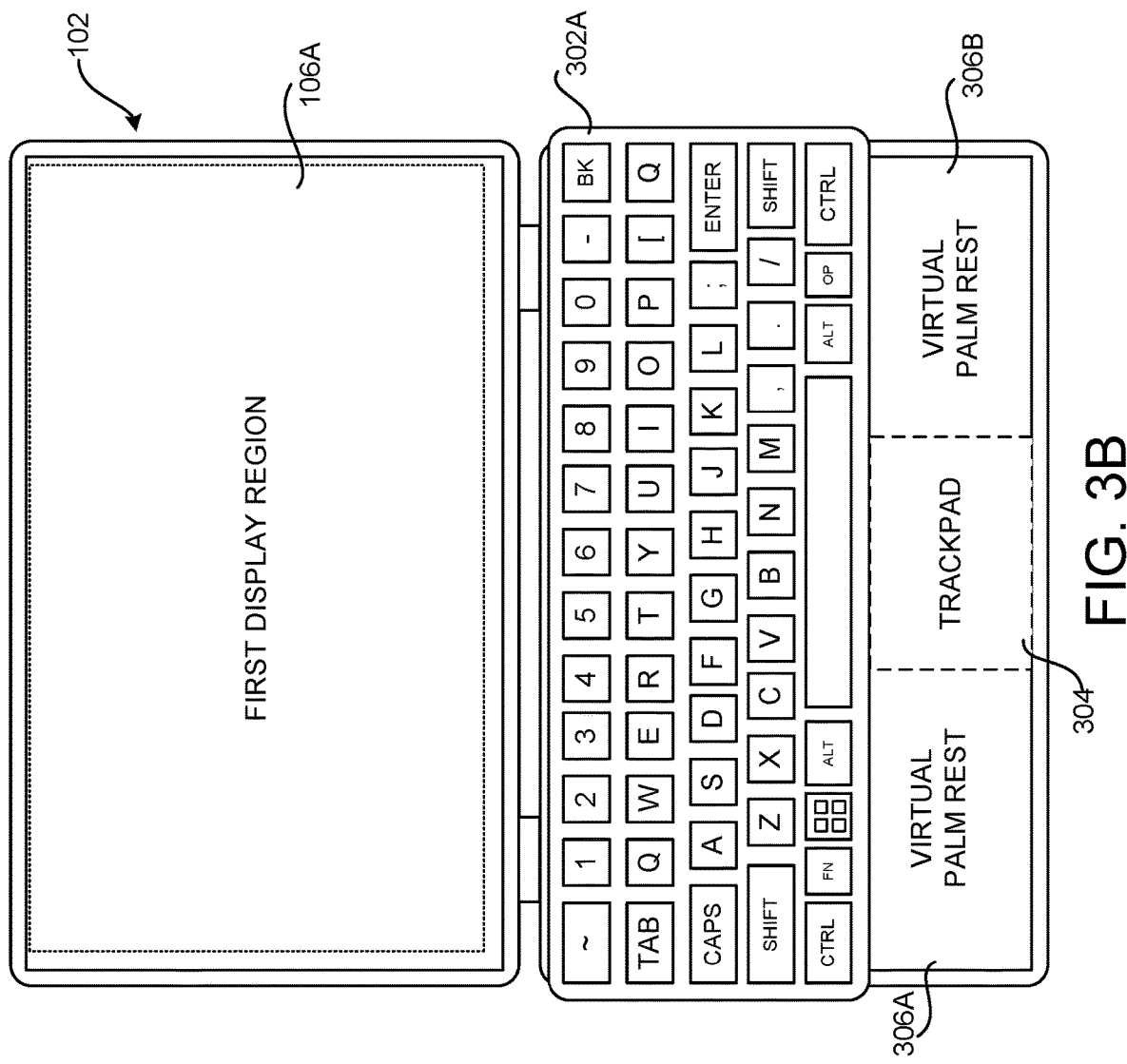

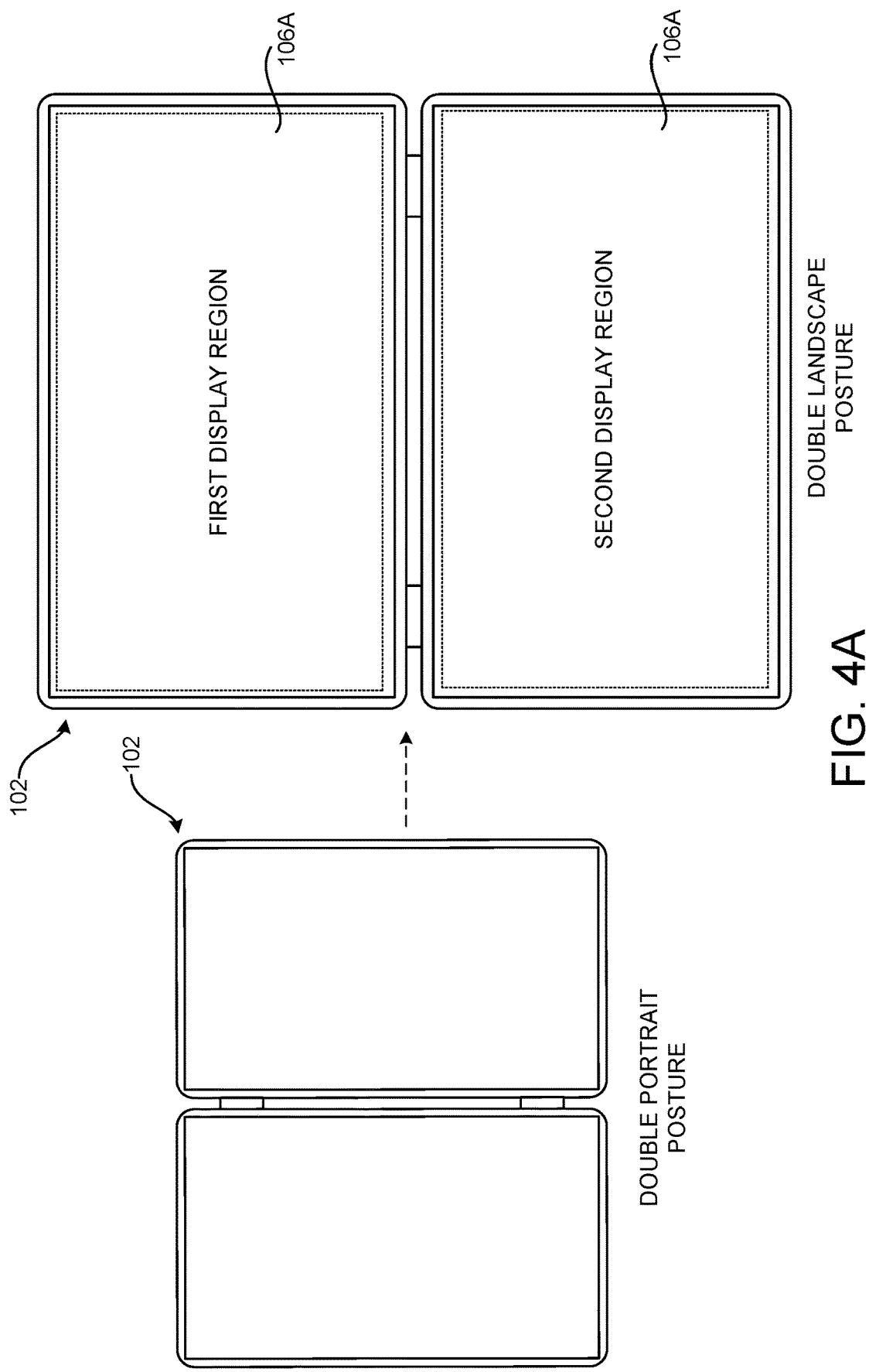

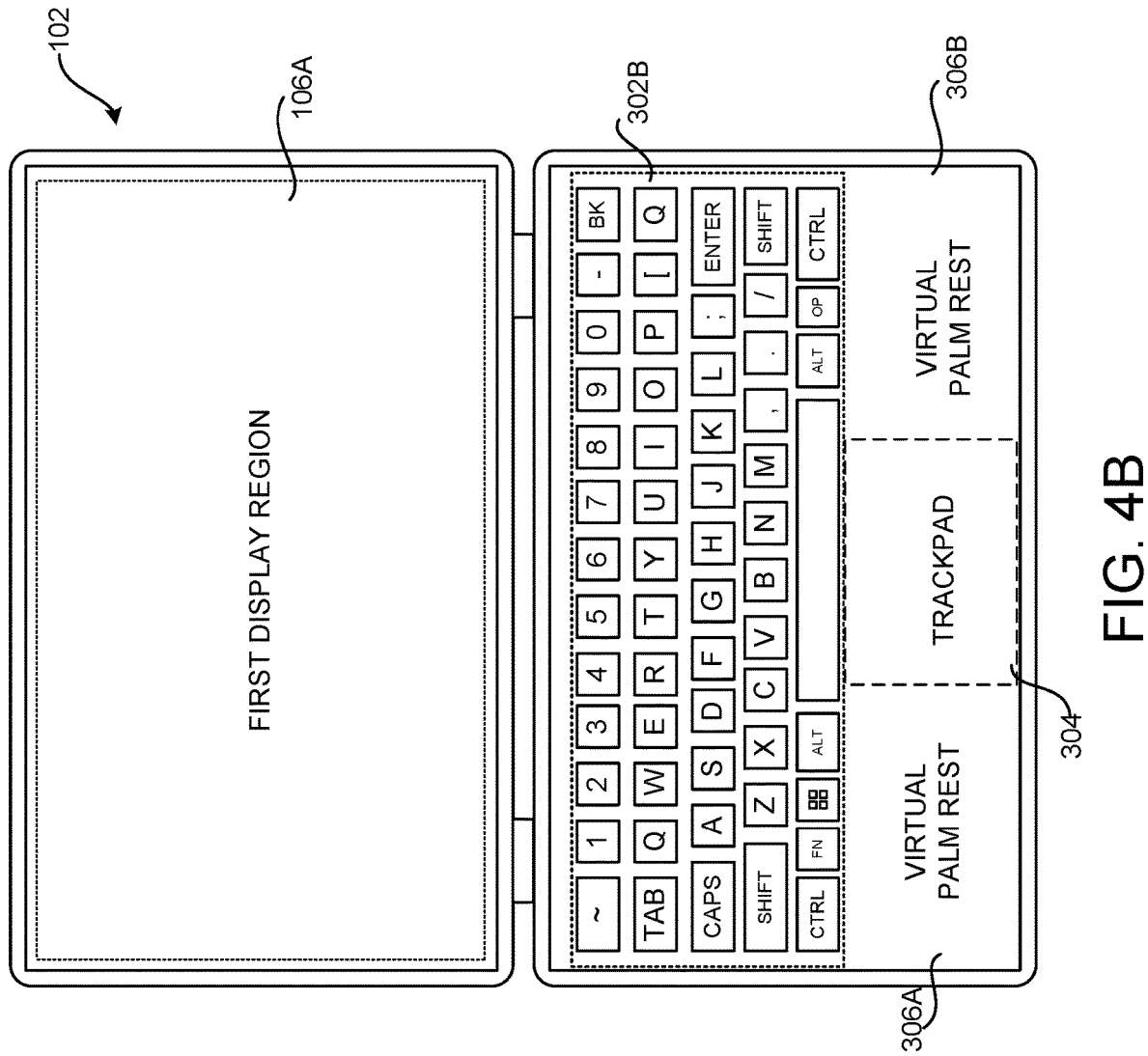

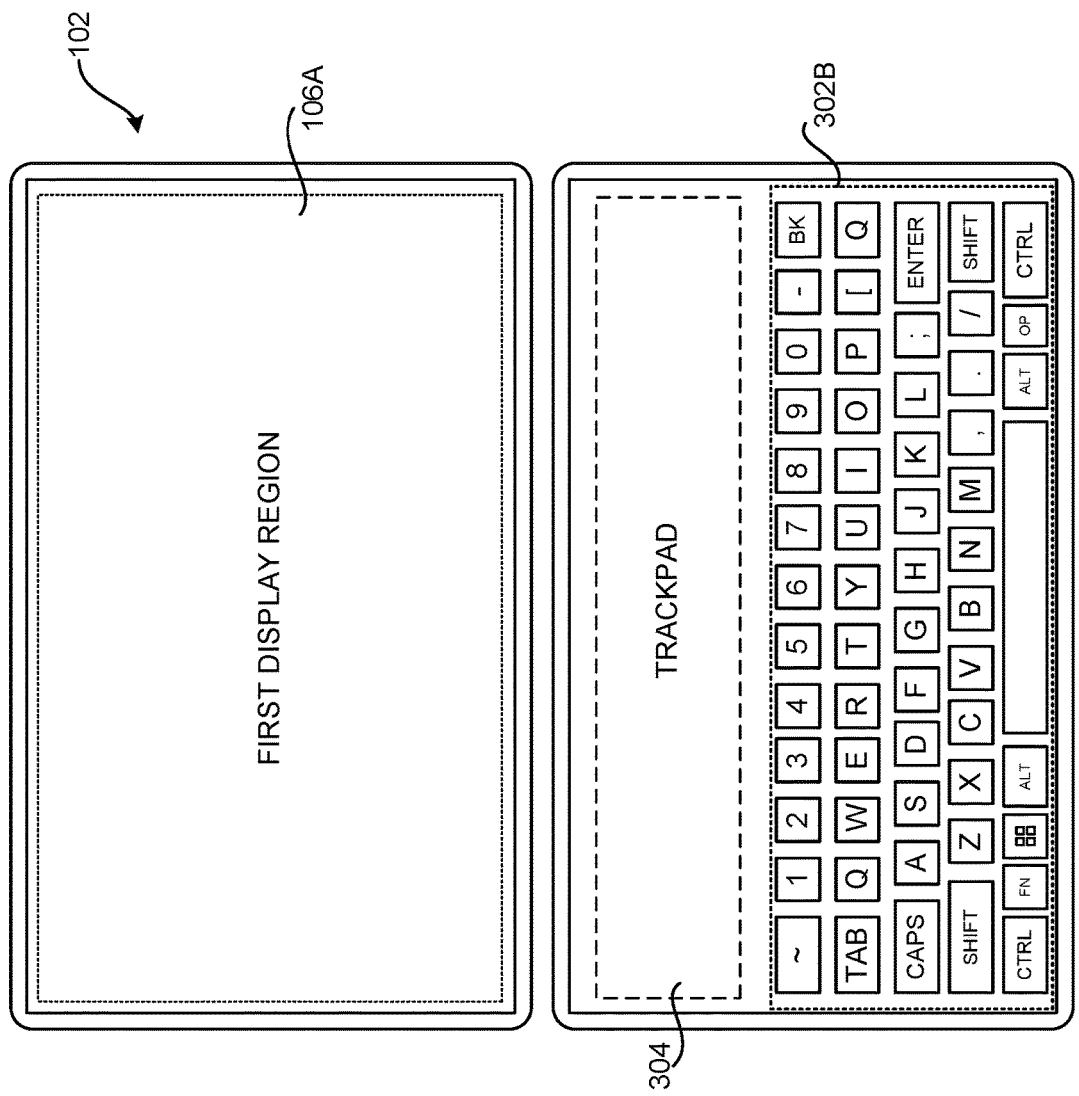

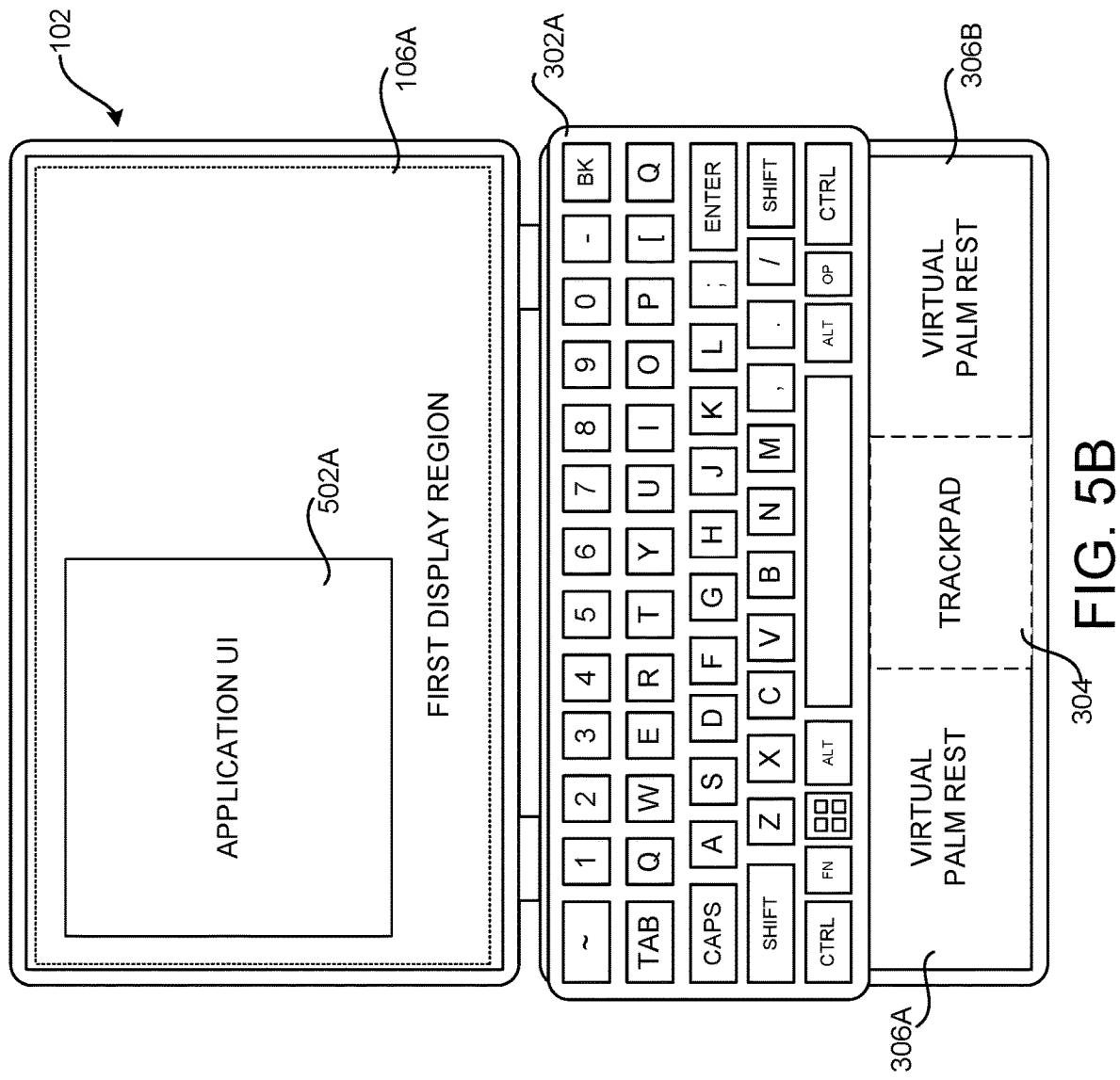

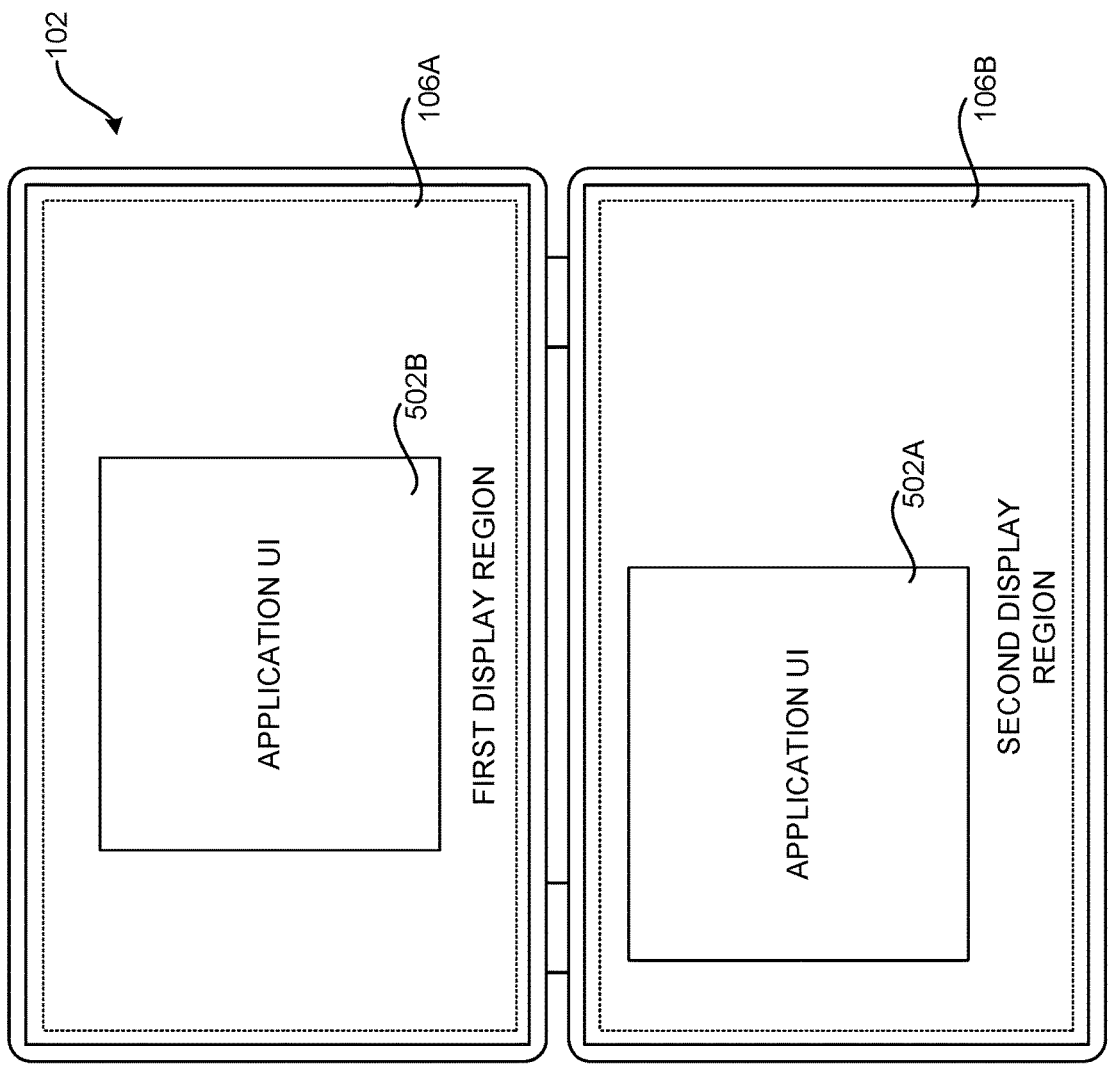

TRANSITIONS AND OPTIMIZATIONS FOR A FOLDABLE COMPUTING DEVICE OPERATING IN A PRODUCTIVITY MODE

CROSS-REFERENCE TO RELATED APPLICATIONS

This application claims priority to U.S. Provisional Patent Application No. 62/909,190, entitled "TRANSITIONS AND OPTIMIZATIONS FOR A FOLDABLE COMPUTING DEVICE OPERATING IN A PRODUCTIVITY MODE," which was filed on Oct. 1, 2019, and which is expressly incorporated herein by reference in its entirety.

BACKGROUND

Foldable computing devices include devices with two screens joined with a hinge or devices with bendable screens. These types of devices can provide benefits over traditional computing devices such as laptop computers. Commonly, however, these devices implement user interface ("UI") paradigms originally designed for computing devices with traditional form factors. As a result, UIs provided by foldable computing devices can be cumbersome and error-prone, which can lead to incorrect or inadvertent user input and unnecessary consumption of computing resources.

It is with respect to these and other technical challenges that the disclosure made herein is presented.

SUMMARY

Technologies are disclosed herein for providing transitions and optimizations for a foldable computing device operating in a productivity mode. The disclosed technologies address the technical problems described above by providing optimized UIs when a foldable computing device is operating in a productivity mode and a hardware or software keyboard occludes a portion of a display region provided by the foldable computing device. The disclosed technologies further address the technical problems described above by relocating one or more UI windows presented in a second display region to a first display region when a foldable computing device is operating in a productivity mode and a hardware or software keyboard in the second display region occludes the UI windows.

Through implementations of the disclosed technologies, UIs can be provided by foldable devices that are easier to utilize and that result in fewer user input errors. Additionally, the utilization of computing resources by foldable computing devices can be reduced by avoiding the processing associated with inefficient navigation of a UI and inadvertent or incorrect user input. Other technical benefits not specifically mentioned herein can also be realized through implementations of the disclosed subject matter.

In one embodiment, a foldable computing device is configured to provide transitions and optimizations while operating in a productivity mode. These transitions and optimizations generally apply to foldable devices that are configured in a posture resembling a traditional laptop computer (i.e. a foldable device that is bent with two display regions in landscape orientation and that has a hardware keyboard attached or a software keyboard displayed). While in this posture, the foldable device might be referred to herein as operating in a "productivity mode." Additionally, the foldable device provides a first display region and a second display region while operating in the productivity mode.

In some embodiments, the foldable computing device can determine if it is operating in productivity mode. If the foldable computing device is operating in productivity mode, it can present a UI in a portion of the second display region that is not occluded by a hardware or software keyboard and that is located below the hardware or software keyboard. The UI can include a virtual trackpad and two virtual palm rejection areas or other components.

If, while operating in productivity mode, the hardware keyboard or the software keyboard occlude all or a portion (e.g. a majority) of the bottom half of the second display region, a UI can be shown above the hardware keyboard or the software keyboard. For example, and without limitation, one or more of a UI showing an image or a video, a UI for selecting an emoji, a UI for selecting a graphics interchange format image ("GIF"), or a UI for displaying contents of a clipboard can be shown in the second display region above the hardware or software keyboard.

In some embodiments, the foldable computing device can adjust the position of UI windows that are occluded when the hardware or software keyboard is placed on the second display region. For instance, if a single UI window is displayed in the second display region when the hardware keyboard is placed over the second display region or the software keyboard is presented in the second display region, the foldable computing device can move the single UI window from the second display region to the first display region. The foldable computing device can move the single UI window back to its original position in the second display region if the hardware or software keyboard no longer occlude the second display region.

In some embodiments, the foldable computing device can adjust the positions of two or more UI windows that are occluded when the hardware or software keyboard is placed on the second display region. For instance, the foldable computing device might move a first UI window and a second UI window from the second display region to the first display region. The foldable computing device might also "snap" the first UI window and the second UI window in the first display region. The foldable computing device can move the UI windows back to their original positions in the second display region if the hardware or software keyboard no longer occlude the second display region.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3D are device UI diagrams illustrating aspects of various mechanisms disclosed herein for providing an optimized UI when a hardware or software keyboard occludes a bottom portion of a display region provided by a foldable computing device operating in productivity mode;

FIGS. 4A-4D are device UI diagrams illustrating aspects of various mechanisms disclosed herein for providing an optimized UI when a hardware or software keyboard occludes a top portion of a display region provided by a foldable computing device operating in productivity mode;

FIGS. 5A and 5B are device UI diagrams illustrating aspects of various mechanisms disclosed herein for relocating a UI window when a portion of a display region provided by a foldable computing device operating in productivity mode is occluded by a hardware or software keyboard;

FIGS. 6A and 6B are device UI diagrams illustrating aspects of various mechanisms disclosed herein for relocating multiple UI windows when a portion of a display region provided by a foldable computing device operating in productivity mode is occluded by a hardware or software keyboard;

DETAILED DESCRIPTION

Figure 1B:
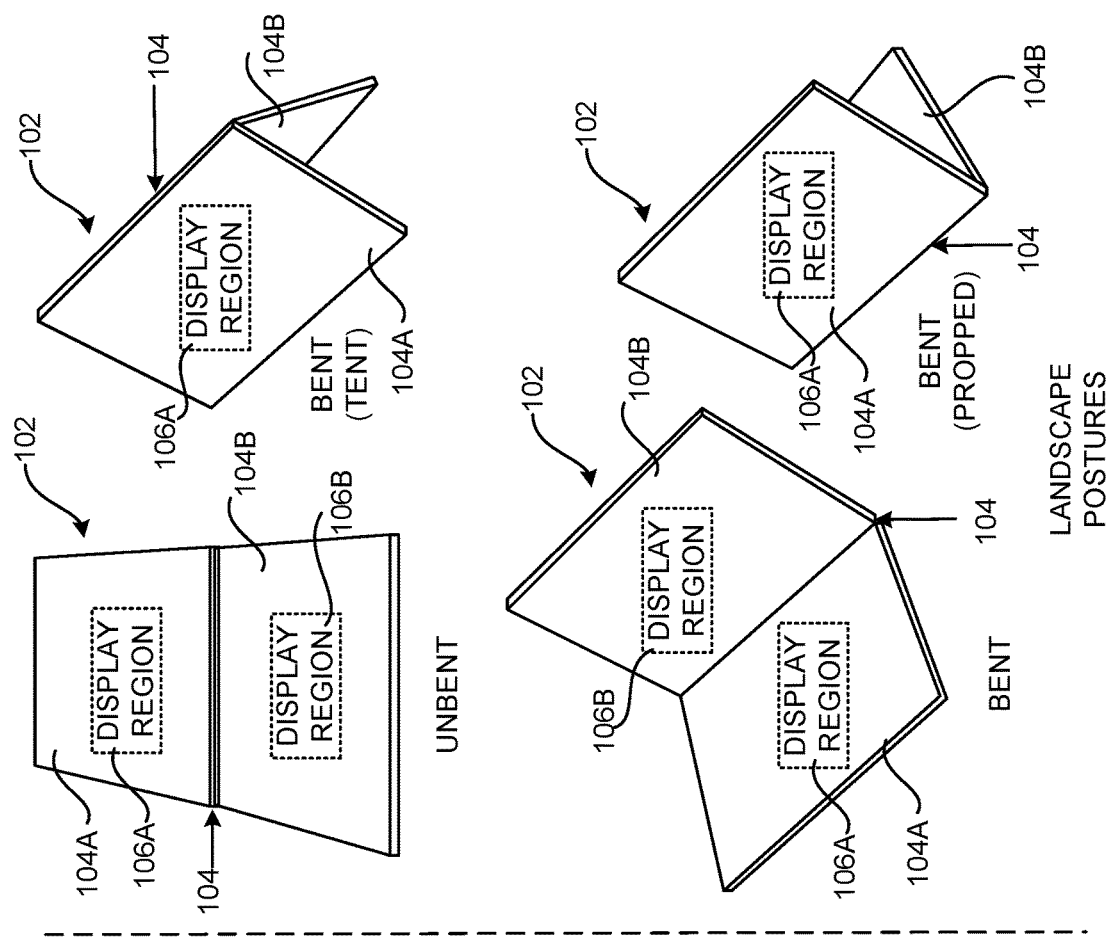
FIGS. 1A and 1B are device posture diagrams illustrating aspects of the configuration and operation of a hinged computing device that implements the disclosed technologies in one particular configuration.

The following detailed description is directed to technologies for providing transitions and optimizations for a foldable computing device operating in a productivity mode. As discussed briefly above, implementations of the disclosed technologies can enable UIs to be provided that are easier to utilize and that result in fewer user input errors. Consequently, the utilization of computing resources can be reduced by avoiding the processing associated with inefficient navigation of a UI and inadvertent or incorrect user input, as compared to previous solutions. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing transitions and optimizations for a foldable computing device operating in a productivity mode will be described.

Prior to discussing particular aspects of the disclosed technologies, a brief introduction to foldable computing devices (which might be referred to herein as "foldable devices") will be provided. As discussed briefly above, foldable devices include multiple screen form factor devices (which might be referred to herein as "hinged devices") that have two physical display screens joined together with a hinge or other equivalent mechanism. By manipulating the orientation of the display screens with respect to one another by way of the hinge, such devices can be configured in a multitude of postures, some of which are described in greater detail below with regard to FIGS. 1A and 1B.

Foldable devices also include computing devices having a bendable display screen (which might be referred to herein as "bendable devices"), such as computing devices utilizing flexible screen technology. When such a device is not bent, it presents a single display surface. When bent, these devices present a single display surface with a crease in the middle. Bendable devices can also be configured in a multitude of postures by varying the amount of bend, some of which are also described in greater detail below with reference to FIGS. 1A and 1B.

The display screens of foldable computing devices can be touch sensitive, thereby enabling such devices to recognize touch or stylus input, presses, swipes, and other types of gestures, some of which are described below. These devices can also, of course, be used while being held in various orientations, some of which are described below with regard to FIGS. 1A and 1B.

Figure 1A:
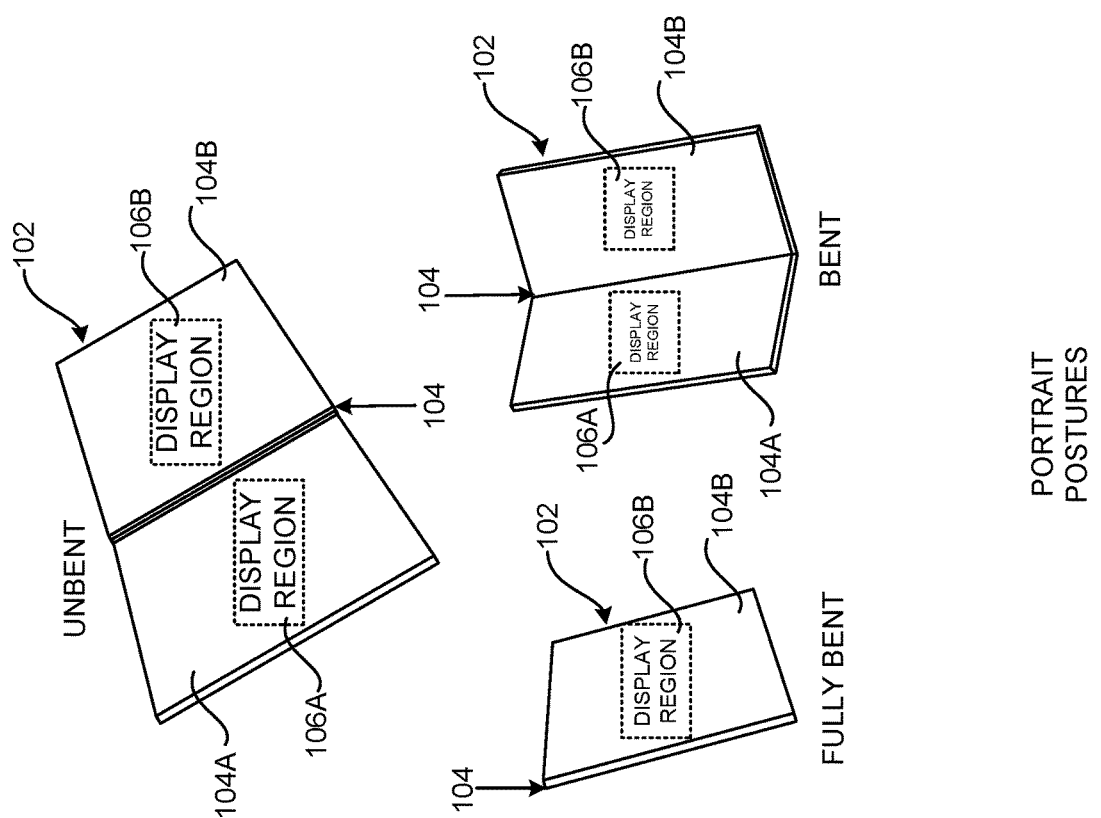

Referring now to FIGS. 1A and 1B, details regarding several postures for foldable display devices will be described. The examples shown in FIGS. 1A and 1B illustrate some possible postures for a hinged device 102. It is to be appreciated, however, that the illustrated postures generally apply to bendable devices as well.

As shown in FIG. 1A, a hinged device 102 can be configured in multiple postures by varying the angle of the hinge 104 that connects two display devices 104A and 104B (which might be referred to herein as "displays"). In FIG. 1A, for instance, the hinged device 102 is shown in a flat posture where the display screens 104A and 104B are parallel to one another in portrait orientation, a completely open posture where only a single display 104B is visible in portrait orientation, and partially open posture in portrait orientation where the hinge 104 is bent. The hinged device 102 can also be configured in a closed posture (not shown) where neither display screen is visible.

In FIG. 1B, the hinged device 102 is shown in a flat posture where the display screens 104A and 104B are in landscape orientation, in tented and propped postures where the angle of the hinge 104 enables the hinged device 102 to stand on its own and present a single display 104A, and in a partially open posture where one display 104A is flat and the other display 104B is at least partially upright, thereby forming a configuration similar to a traditional laptop computer. In this regard, it is to be appreciated that the postures illustrated in FIGS. 1A and 1B are illustrative and that other postures might also be possible.

As also shown in FIGS. 1A and 1B, the display device 104A provides a first display region 106A that encompasses all or a part of the display 104A. Similarly, the display device 104B provides a second display region 106B that encompasses all or a part of the display 104B. The first display region 106A and the second display region 106B can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. Various uses of the display regions 106A and 106B provided by the hinged device 102 will be described below.

Figure 2B:
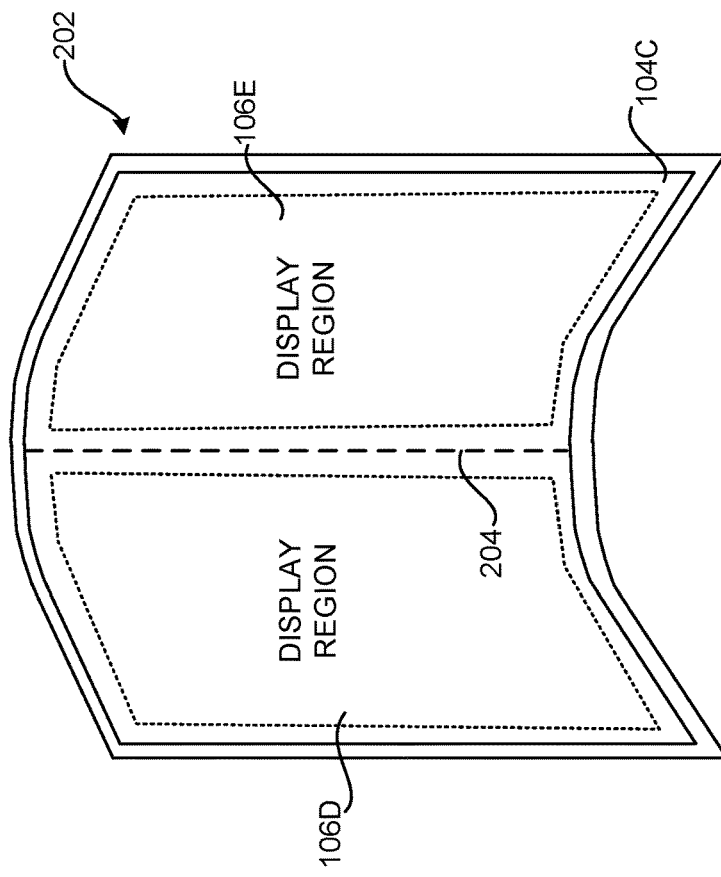
FIGS. 2A-2C are device posture diagrams illustrating aspects of the configuration and operation of a bendable computing device that implements the disclosed technologies in one particular configuration.
Figure 2A:
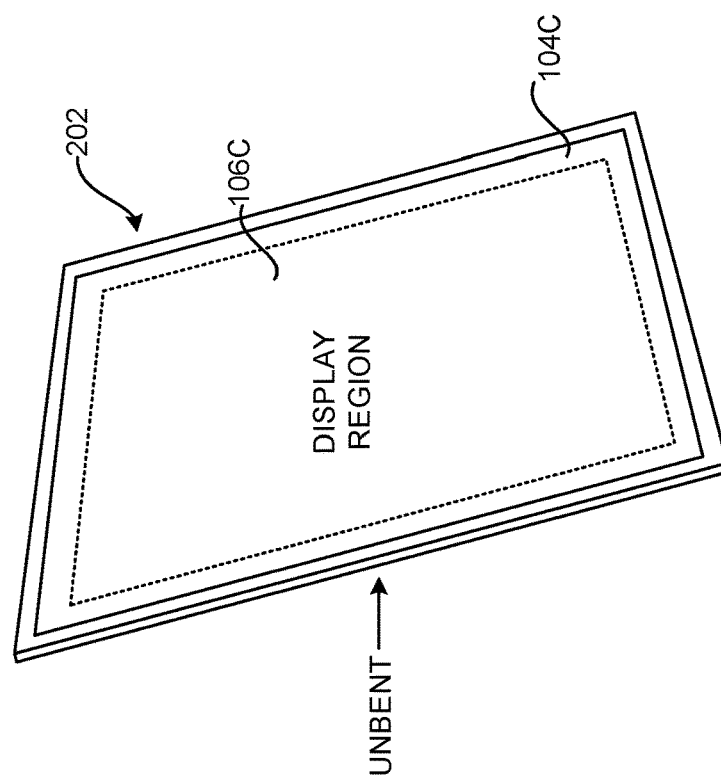

Referring now to FIGS. 2A and 2B, details will be provided regarding the configuration and operation of a bendable device 202. As mentioned above, a bendable device 202 can also be configured in postures the same as or similar to those described above with regard to FIGS. 1A and 1B. For instance, in the example posture shown in FIG. 2B, the bendable device 202 has been placed in an unbent position, thereby presenting the entirety of the display 104C. The bendable device 202 can also be configured in a closed posture where neither display screen is visible.

Figure 2C:
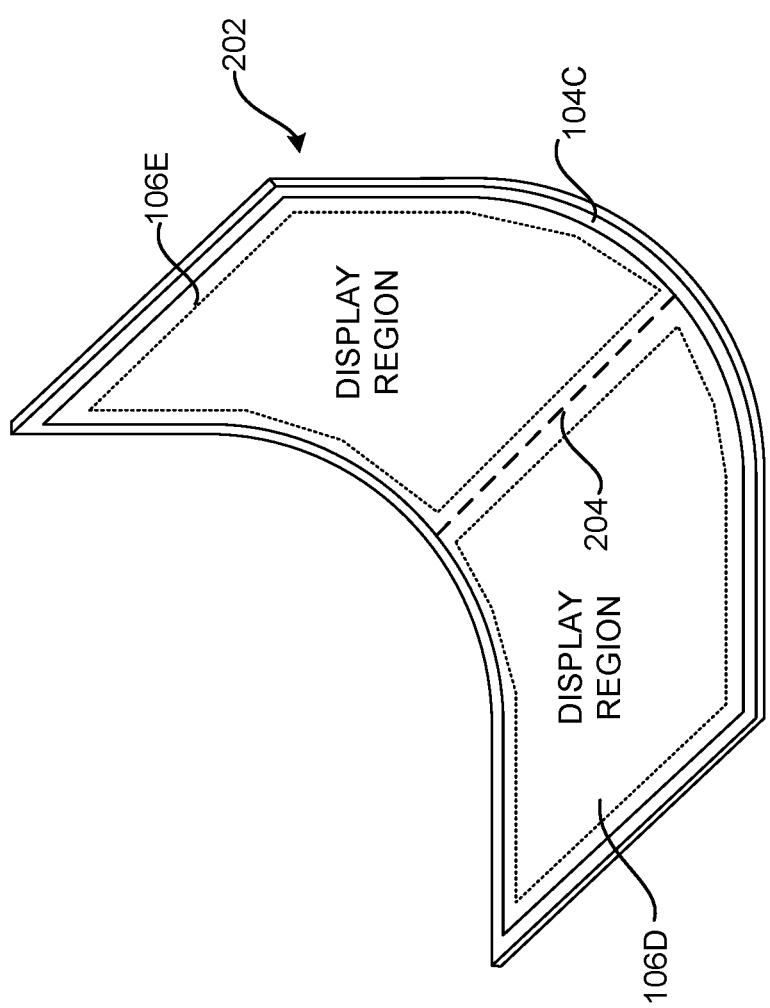

In the example posture shown in FIGS. 2B and 2C, the bendable device 202 has been partially bent similar to the partially open posture shown in FIGS. 1A and 1B. In particular, in the example shown in FIG. 2B, the bendable device 202 has been bent while the screen 104C is in a landscape orientation. In the example shown in FIG. 2C, the device 202 has been bent while the screen 104C is in portrait orientation.

When the bendable device 202 is bent, a crease or "fold" 204 is formed in the display 104C. The term "fold" as used herein might refer to the area where a foldable device is folded (i.e. the area of a hinge 104 on a hinged device 102 or the area where the display of a bendable device 202 bends).

As in the case of a hinged device 102, the bendable device 202 can also provide one or more display regions. However, in the case of a bendable device 202, the number of available display regions can vary based upon the posture of the device. For instance, a single display region 106C is provided when the bendable device 202 is in an unbent state as shown in FIG. 2A. Two display regions 106D and 106E can be provided on the display 104C when the bendable device 202 is in a bent posture, such as that shown in FIG. 2B. Various details regarding the configuration and use of the display regions 106 (which are rendered using dotted lines throughout the FIGS.) provided by foldable devices are provided below.

Referring now to FIGS. 3A-3D, details will be provided regarding technologies for providing transitions and optimizations for a foldable computing device operating in a productivity mode. The examples shown in FIGS. 3A-3D (and FIGS. 2A-6B) illustrate aspects of the operation of a hinged device 102 according to embodiments disclosed herein. It is to be appreciated, however, that the disclosed aspects are not limited to use with a foldable computing device but can be utilized with other foldable devices including bendable devices 202. It is also to be appreciated that the foldable device 102 shown in FIGS. 3A-3D (and FIGS. 4A-6B) has been shown two-dimensionally for ease of illustration. This is not, however, intended to indicate that the foldable device 102 is lying flat. Rather, the foldable device 102 is configured in these FIGS. in a posture similar to that of a laptop computer when in use.

Prior to discussing FIGS. 3A-3D and the other FIGS., it is also to be appreciated that certain relative terms (e.g. height, width, top, bottom, left, right) might be utilized herein to describe the configuration of the displays and display regions in the examples presented herein. In this regard, it is to also be appreciated that these terms have been utilized herein for ease of discussion and are not to limit the configuration of the display regions or UI elements. Other terms can be utilized to describe the displays, display regions, UI elements, and their spatial relationships to one another It is also to be appreciated that although generally described separately, the various embodiments described briefly above and in further detail below can be utilized in combination with one another.

As discussed briefly above, foldable devices can be manipulated between a portrait and landscape orientations. As also discussed above, these devices can be bent to various degrees by modifying the angle of a hinge. In the case of a hinged device 102, the hinge 104 is typically visible from the front and rear of the device. In the case of a bendable device 202, the hinge is not visible from the front of the device singe the bendable display 104C encompasses the entirety of the device.

In both types of foldable devices, the hinge can be configured with a sensor capable of measuring the angle of bend of the hinge (i.e. the "hinge angle") and providing data to a processor of the device that specifies the hinge angle. Additionally, or alternately, the hinge angle can be computed by using other sensor information (e.g. by comparing IMU readings from each side). As will be described in greater detail below, the various types of functionality can be provided when the reported hinge angle and potentially information from other sensors indicates that a foldable device is in a posture similar to that of a traditional laptop computer.

Figure 3A:
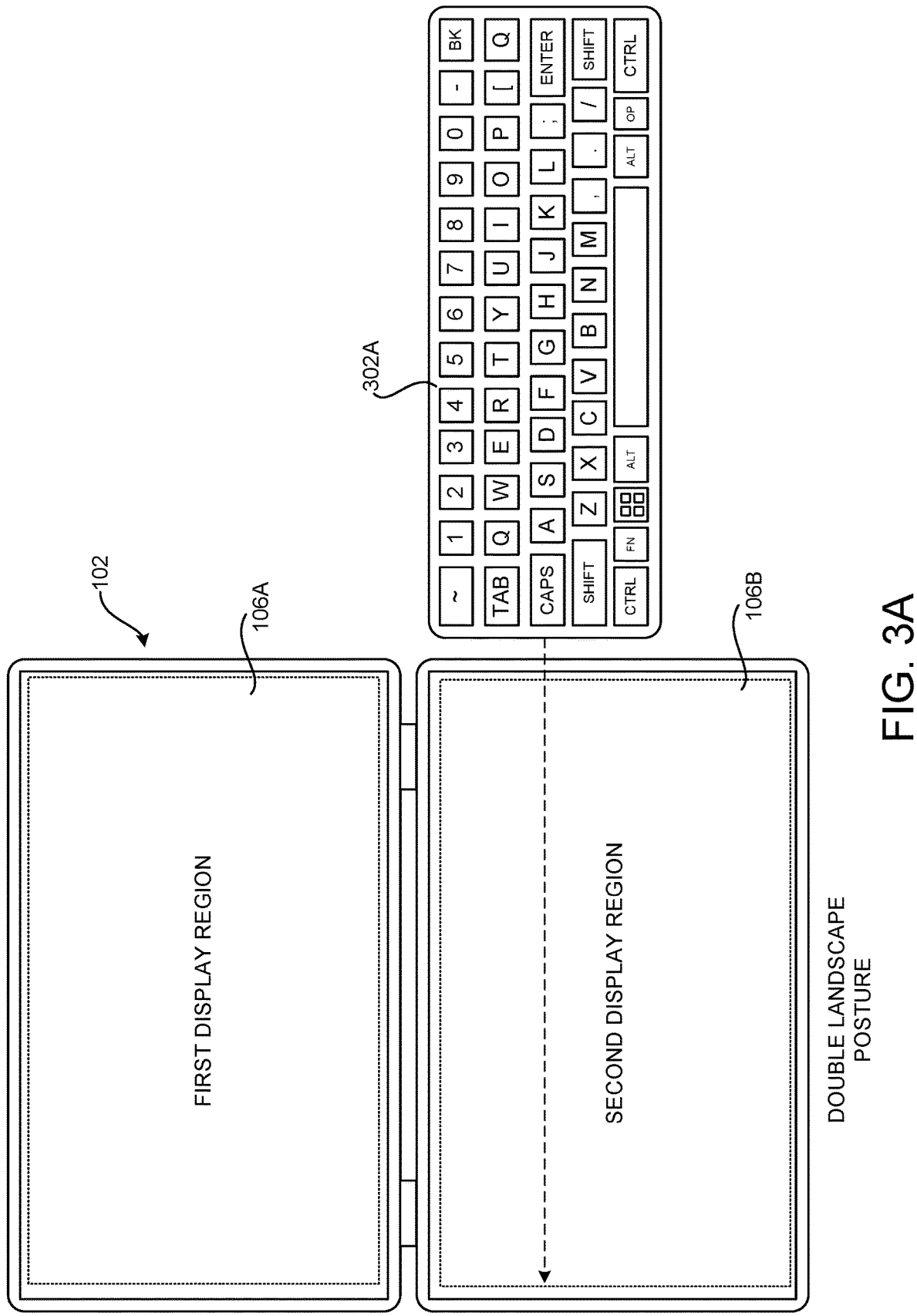

FIGS. 3A-3D are device UI diagrams illustrating aspects of various mechanisms disclosed herein for providing an optimized UI when a hardware or software keyboard occludes a bottom portion of a display region provided by a foldable computing device operating in productivity mode. As discussed briefly above, this functionality, and the other transitions and optimizations disclosed herein, generally apply to foldable devices that are configured in a posture resembling a traditional laptop computer (i.e. a foldable device that is bent with two display regions in landscape orientation as shown in FIG. 3A). This posture might also be referred to herein as "double landscape."

The hinged device 102 can determine if it is configured in the double landscape posture (and other postures) using the reported hinge angle and, potentially, information provided by other sensors. While the device 102 is in this posture and a hardware or software keyboard is present on the bottom display region, the foldable device might be referred to herein as operating in a "productivity mode" or a "compose mode." Additionally, the foldable device provides a first display region and a second display region as set forth above while operating in this posture. In some embodiments, the hinged device 102 will display a software keyboard on the bottom display region when the device 102 is configured in the double landscape posture.

In some embodiments, the foldable computing device 102 will not enter productivity mode until the device is placed into a posture resembling a traditional laptop computer (as shown, for instance in FIG. 4A, where the device 102 has been rotated from a double portrait posture to double landscape posture) and the device 102 detects that productivity applications are executing on the device 102. For instance, the device 102 might not enter productivity mode until the correct posture is detected and the device 102 is executing an email, word processing, spreadsheet, note-taking, presentation, personal information management, other type of productivity application.

In some embodiments, the device 102 enters productivity mode when a hardware keyboard 302A is placed on top of the second display region 106B (as shown in FIGS. 3A and 3B), thereby occluding a portion of the second display region as shown in FIG. 3B. The hardware keyboard 302A can utilize BLUETOOTH or another suitable technology to communicate with the device 102. Additionally, the device 102 can detect the presence and location of the hardware keyboard 302A on the second display region 106B using capacitive sensors, Hall effect sensors, or other touch technologies.

The device 102 might also enter productivity mode when a virtual or software keyboard 302B is instantiated in the second display region 106B as shown in FIG. 4B. This software keyboard 302B can be instantiated manually by a user or shown automatically when the device 102 is configured in a double landscape posture. The first display region 106A is not occluded when the hardware keyboard 302A or software keyboard 302B is placed on the second display region 106B.

As shown in FIG. 3B, if the hinged computing device 102 is operating in productivity mode, it can present a UI in the second display region 106B that is below the hardware keyboard 302A when the hardware keyboard 302 is placed over just the top portion of the second display region 106B. As shown in FIG. 4B, the device 102 can also present a UI in the second display region 106B that is below the software keyboard 302B when the software keyboard 302B is placed in the second display region 106B such that it occludes (e.g. occludes a majority) only the top portion of the second display region 106B (i.e. the portion of the second display region 106B closest to the hinge).

As shown in FIGS. 3B and 4B, the UI shown in the bottom portion of the second display region can include a virtual trackpad 304 and two virtual palm rejection areas (which might be referred to herein as "virtual palm rests 306A and 306B") or other components. The trackpad 304 can detect touch input and, in response thereto, control various aspects of the operation of the device 102.

Additionally, various aspects of the operation of the device 102 can be modified when the trackpad is shown 304 such as, but not limited to, reducing the size of various UI elements, showing higher density UI targets, increasing the precision of pointing and selection operations using a mouse cursor, and others. Input received in the virtual palm rest areas 306A and 306B will not be registered.

Figure 3C:
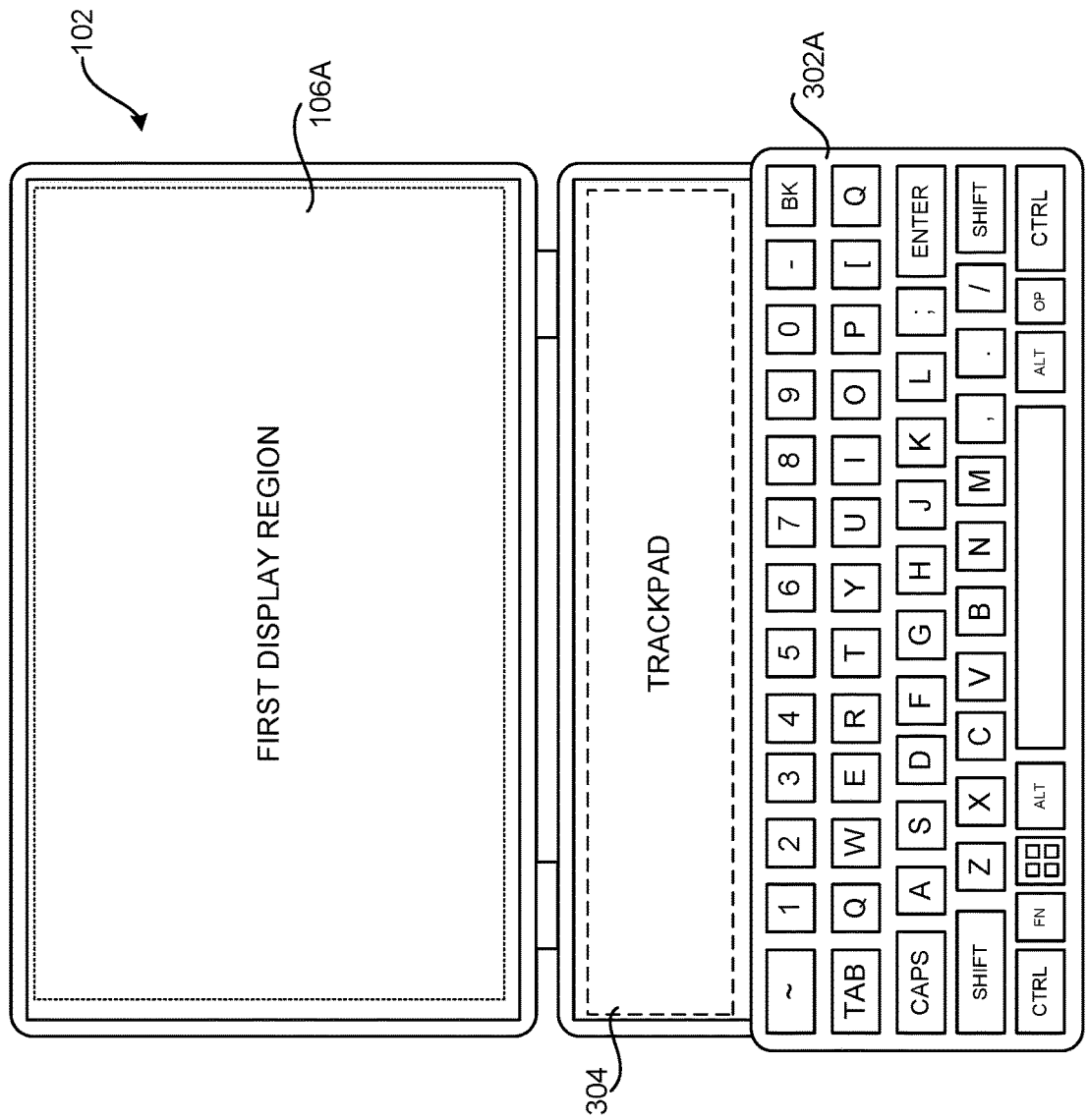

As shown in FIGS. 3C and 4C, if the hardware keyboard 302A or the software keyboard 302B occlude the bottom portion (e.g. occlude a majority of the bottom portion) of the second display region 106B (i.e. the portion of the second display region 106B furthest from the hinge), a UI can be shown above the hardware keyboard 302A or the software keyboard 302B. For example, a virtual trackpad 304 can be shown above the keyboard 302A or 302B. In some embodiments, the trackpad 304 encompasses all of or a substantial portion of the width of the display area 106B.

Figure 3D:
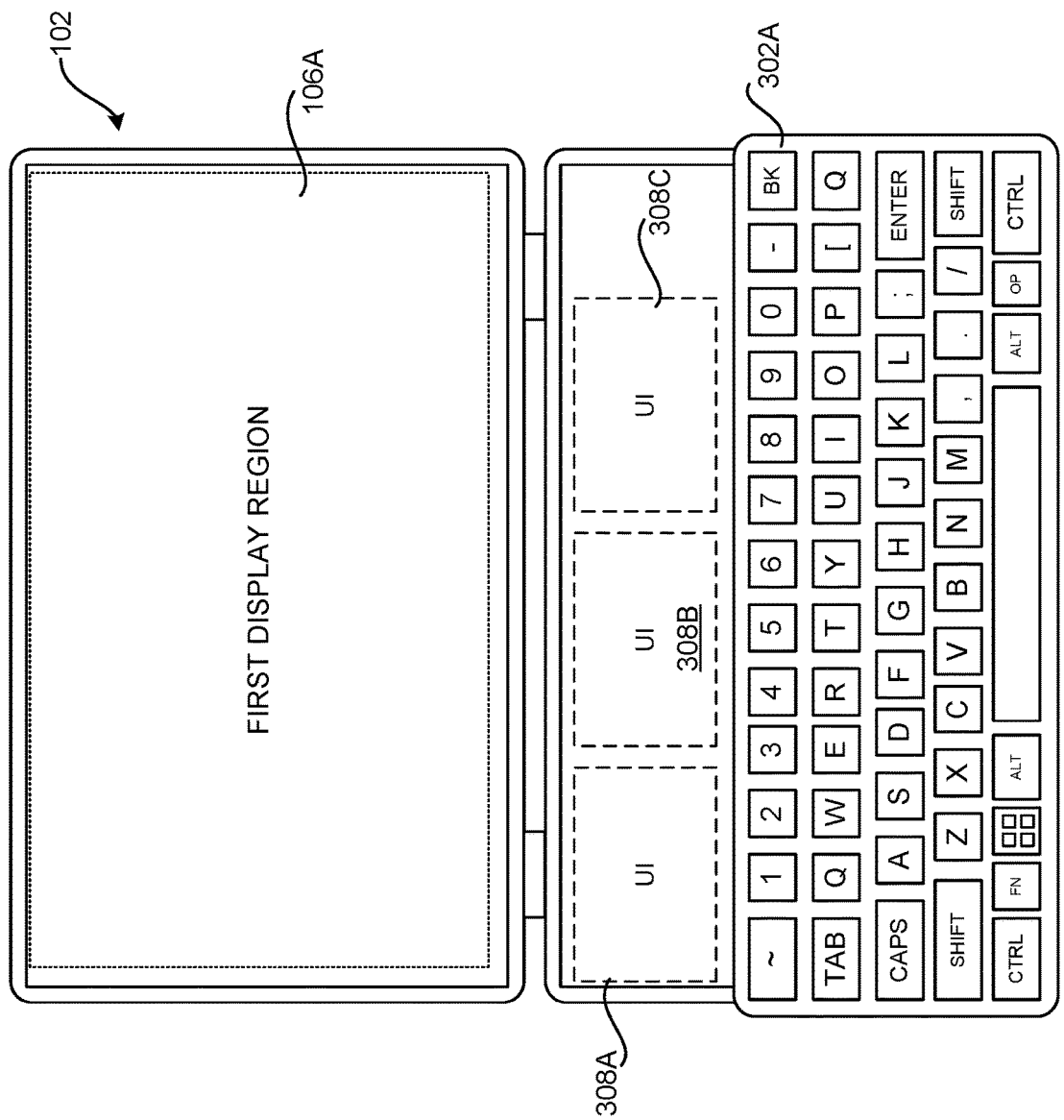
Figure 4D:
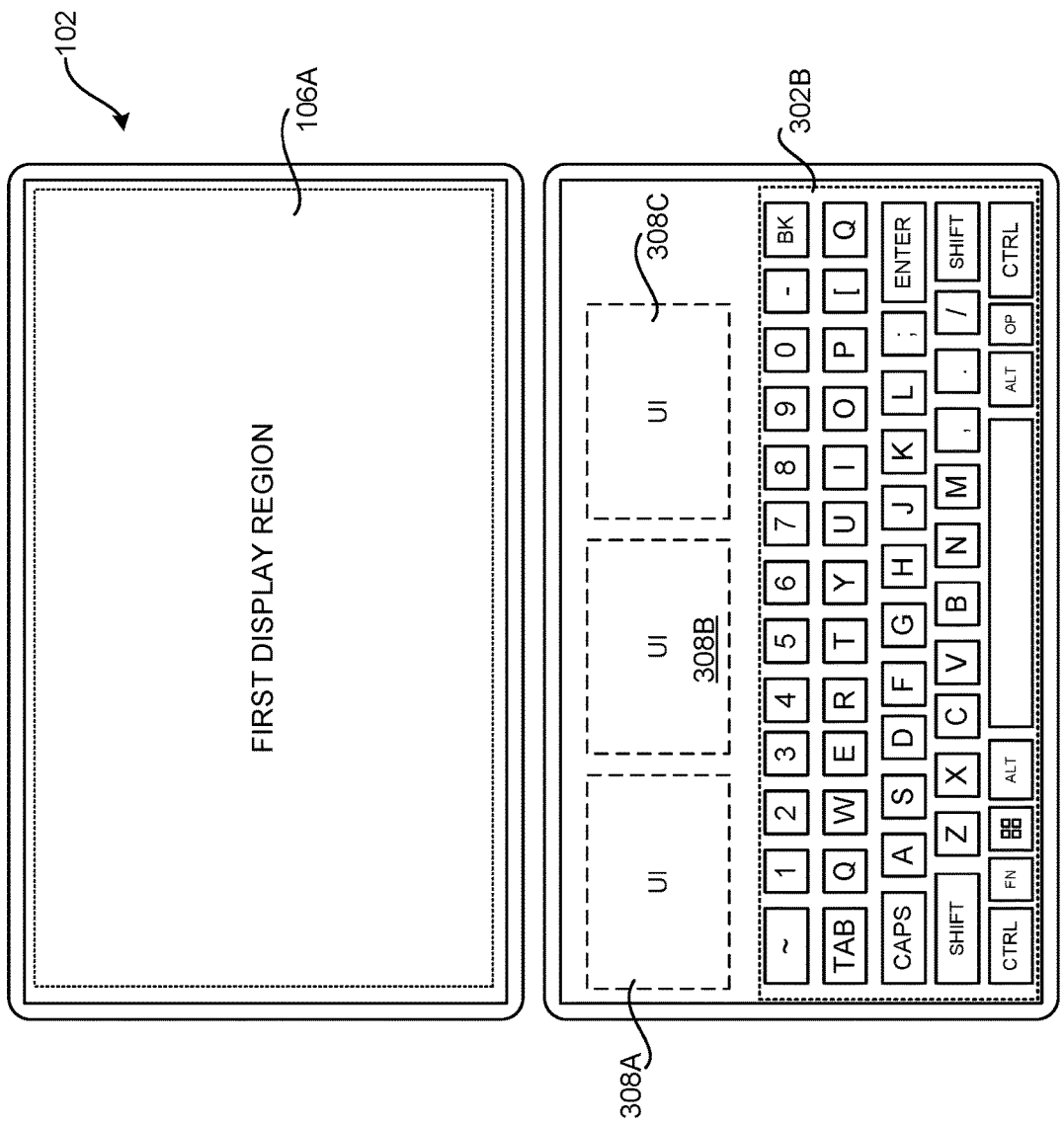

As shown in FIGS. 3D and 4D, other types of UI elements 308A-308C can be shown above the hardware keyboard 302A or the software keyboard 302B if the hardware keyboard 302A or the software keyboard 302B occlude only the bottom portion of the second display region 106B. For example, and without limitation, one or more of a UI showing an image or a video, a UI for selecting an emoji, a UI for selecting a GIF (or other type of animated image), a picture-in-picture video, media controls (e.g. play/pause, volume, etc.), application UI that extends a UI of an application displayed in the first display region, or a UI for displaying contents of a clipboard can be shown above the hardware or software keyboard. Other types of UI elements can be shown in the portion of the second display region 106B above the software or hardware keyboard in other embodiments.

Figure 5A:
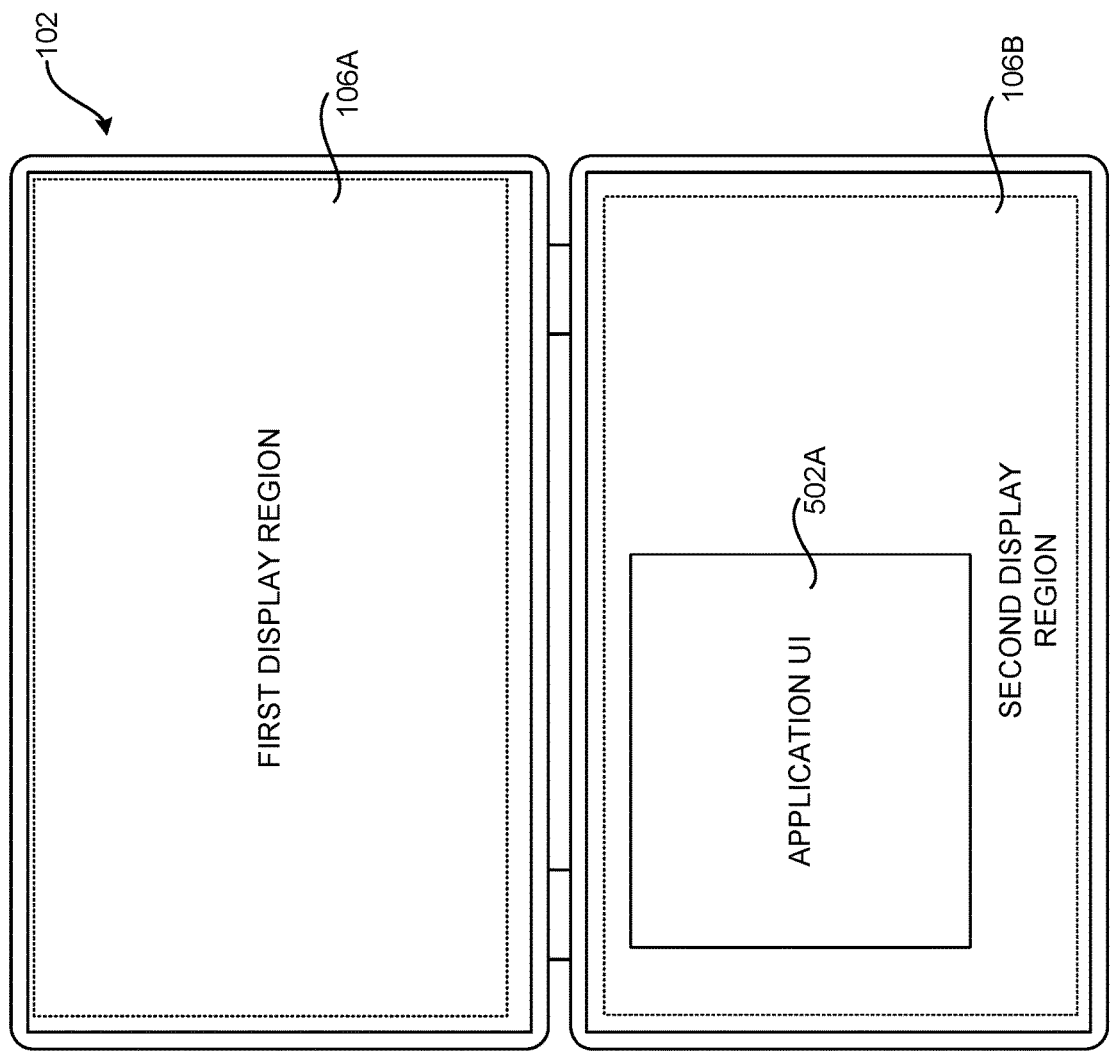

FIGS. 5A and 5B are device UI diagrams illustrating aspects of various mechanisms disclosed herein for relocating a UI window when a portion of a display region provided by a foldable computing device operating in productivity mode is occluded by a hardware or software keyboard. In the example shown in these FIGS., for instance, a single UI window 502A generated by an application (or another component) is shown in the second display region 106B.

If a hardware keyboard 302A is placed over the second display region 106B (as shown in FIG. 5B) or a software keyboard 302B is presented in the second display region 106B, the foldable computing device 102 can move the single UI window 502A from the second display region 106B to the first display region 106A. The foldable computing device 102 can move the single UI window 502A back to its original position in the second display region 106B if the hardware or software keyboard 302 no longer occlude the second display region 106B.

Figure 6B:
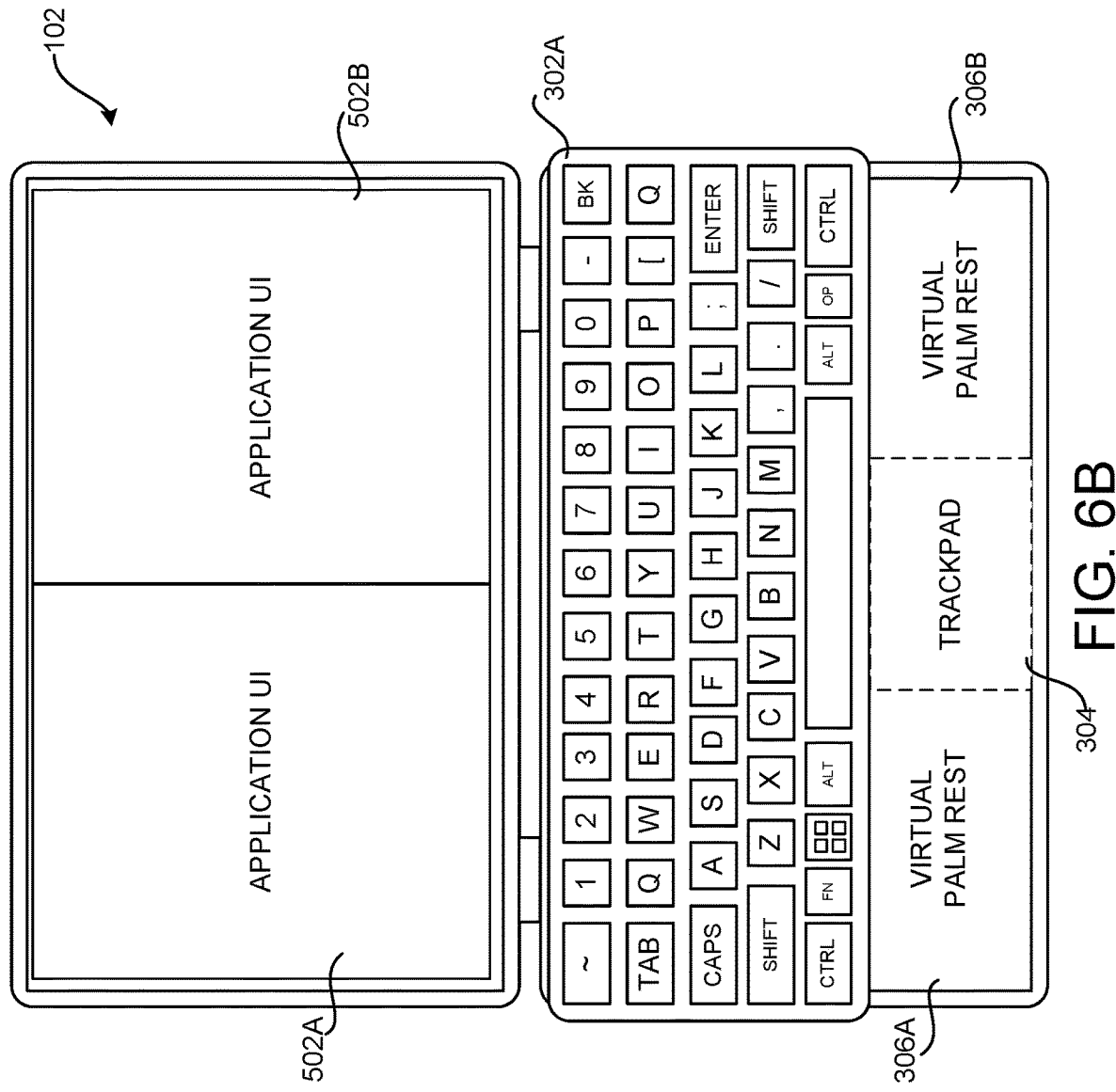

FIGS. 6A and 6B are device UI diagrams illustrating aspects of various mechanisms disclosed herein for relocating multiple UI windows 502A and 502B when a portion of a display region 106B provided by a foldable computing device 102 operating in productivity mode is occluded by a hardware or software keyboard. In the example shown in these FIGS., for instance, a UI window 502A generated by an application (or another component) is shown in the second display region 106B. A UI window 502B generated by the same or different application or component is shown in the first display region 106A.

If a hardware keyboard 302A is placed over the second display region 106B (as shown in FIG. 6B) or a software keyboard 302B is presented in the second display region 106B, the foldable computing device 102 can move the UI window 502A from the second display region 106B to the first display region 106A. Additionally, the device 102 can "snap" the UI window 502A and the UI window 502B in the first display region 106A.

When two windows are snapped, each window is placed against an edge of the display region (e.g. the left edge in the case of the UI window 502A and the right edge in the case of the UI window 502B) and maximized such that the windows 502A and 502B together fill up the available space of the display region 106A. Three or more windows may be snapped in some implementations, which may result in a subset of those windows not being placed against an edge of the display region (e.g. three windows horizontally tiled such that they occupy the entirety of the display region 106A).

As in the example discussed above with regard to FIGS. 5A and 5B, the foldable computing device 102 can move the UI windows 502A and 502B back to their original positions in the first and second display regions if the hardware or software keyboard 302 no longer occlude the second display region 106B. In this regard, it is to be appreciated that in some embodiments windows 502 will not be moved back to their original locations when the device 102 exits productivity mode if the windowing state (i.e. the state of the UI windows present on the device 102) has changed since the windows 502 were moved. For example, and without limitation, the windows 502 will not be moved back to their original locations if one or more of the windows have been closed. Other activities can change the windowing state such as, but not limited to, opening a new window. In this way, transitions out of productivity mode reverse the initial transition of windows if the windowing state remained static while in productivity mode or, optionally, if the current windowing state matches the original state (e.g. if the user changed the state of windows and then changed it back).

Figure 7:
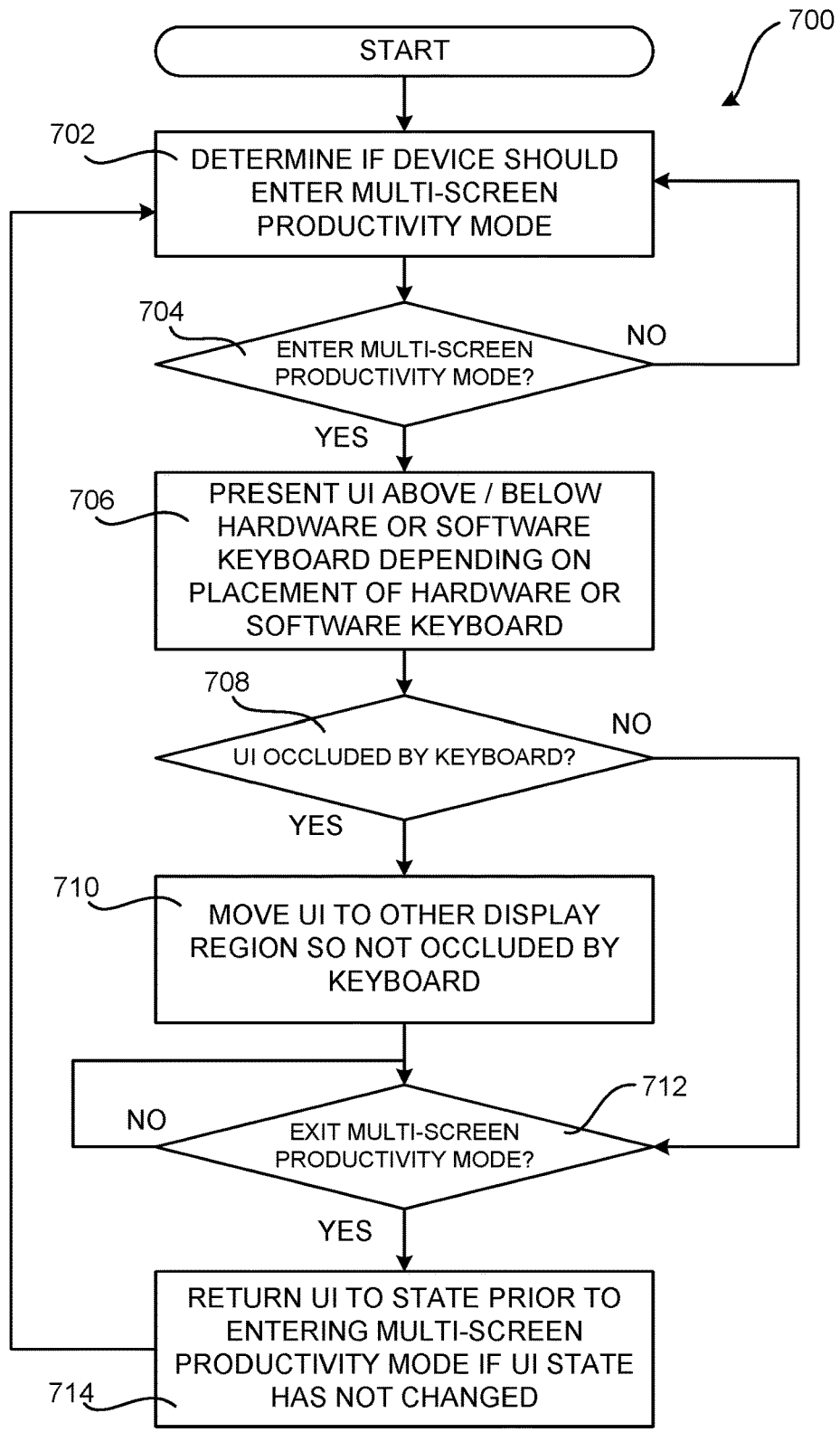
FIG. 7 is a flow diagram showing a routine that illustrates aspects of the operation of a foldable computing device for providing transitions and optimizations while operating in a productivity mode, according to one embodiment.

FIG. 7 is a flow diagram showing a routine that illustrates aspects of the operation of a foldable computing device for providing transitions and optimizations while operating in a productivity mode, according to one embodiment. It should be appreciated that the logical operations described herein with regard to FIG. 7, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 700 begins at operation 702, where the device 102 determines if it is to enter productivity mode. As discussed above, the device 102 might enter productivity mode under various conditions, such as being placed in double landscape posture (i.e. a posture where the device is bent and one display is substantially horizontal and the other is substantially vertical similar to when a traditional laptop computer is in use), a hardware or software keyboard being placed on or in the display region 106B, and/or other conditions. If the device 102 is to enter productivity mode, the routine 700 proceeds from operation 704 to operation 706.

At operation 706, the device 102 can present UI elements, such as those described above, below the hardware or software keyboard if the keyboard covers the top portion of the display region 106B (i.e. the portion adjacent to the hinge). Similarly, the device 102 can present UI elements above the hardware or software keyboard if the keyboard covers the lower portion of the display region 106B (i.e. the portion distal from the hinge). In another embodiment, a portion of the second display region remains visible both above and below a hardware or software keyboard. For example, the non-occluded portion below a keyboard may be large enough to display a trackpad a virtual palm rests, while the non-occluded portion above the keyboard may display a single row of virtual buttons. From operation 706, the routine 700 proceeds to operation 708.

At operation 708, the device 102 determines if a UI element (such as the UI windows 502) are occluded by the hardware or software keyboard. If so, the routine 700 proceeds from operation 708 to operation 708, where the UI can be relocated to the display region 106A. The UI elements might be snapped as described above or modified in another way.

From operation 712, the routine 700 proceeds to operation 714, where the UI elements (e.g. the UI windows 502) are returned to their original state when the device exits productivity mode and the windowing state did not change, for instance when a hardware keyboard is removed from the display area 106B or the device is configured in a different posture. From operation 714, the routine 700 proceeds back to operation 702, where the operations described above might be repeated.

Figure 8:
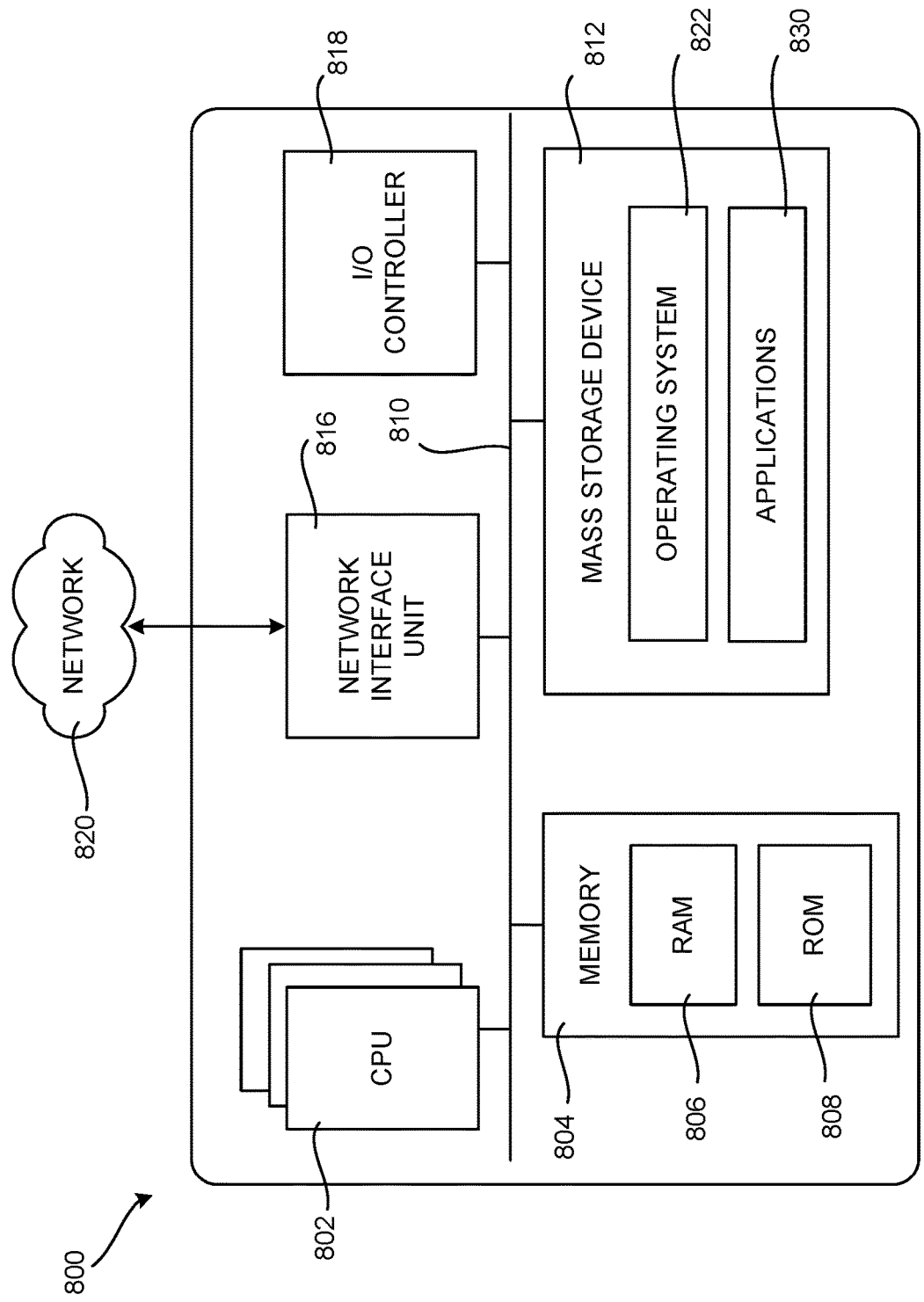
FIG. 8 is a computer architecture diagram showing an illustrative computer hardware and software architecture for a computing device that can implement aspects of the technologies presented herein.

FIG. 8 is a computer architecture diagram showing an illustrative computer hardware and software architecture for a computing device that can implement the various technologies presented herein. In particular, the architecture illustrated in FIG. 8 can be utilized to implement a foldable device, such as the hinged devices 102 and bendable devices 202 described herein. The illustrated architecture can also be utilized to implement other types of computing systems.

The computer 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system ("BIOS" or "firmware") containing the basic routines that help to transfer information between elements within the computer 800, such as during startup, can be stored in the ROM 808. The computer 800 further includes a mass storage device 812 for storing an operating system 822, application programs 830, and other types of programs. The functionality described above is implemented by one or more of these programs in various configurations. The mass storage device 812 can also be configured to store other types of programs and data.

The mass storage device 812 is connected to the CPU 802 through a mass storage controller (not shown) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 820. The computer 800 can connect to the network 820 through a network interface unit 816 connected to the bus 810. It should be appreciated that the network interface unit 816 can also be utilized to connect to other types of networks and remote computer systems. The computer 800 can also include an input/output controller 818 for receiving and processing input from a number of other devices, including a keyboard, mouse, touch input, a digital pen, or a physical sensor such as cameras and biometric sensors.

The computer 800 can also be configured with a suitable video output device that can provide output to one or more display screens, such as those described above. One or more of the displays can be a touch-sensitive display that is configured to detect the presence and location of a touch. Such a display can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen is incorporated on top of a display as a transparent layer to enable a user to use one or more touches to interact with objects or other information presented on the display.

A touch-sensitive display can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the computer 800 supports a tap gesture in which a user taps a display once. A double tap gesture in which a user taps a display twice can also be supported. The double tap gesture can be used for various reasons including, but not limited to, zooming in or zooming out in stages. In some configurations, the computer 800 supports a tap and hold gesture in which a user taps and maintains contact for at least a pre-defined time. The tap and hold gesture can be used for various reasons including, but not limited to, opening a context-specific menu.

In some configurations, the computer 800 supports a pan gesture in which a user places a finger on a display and maintains contact with display while moving their finger. The pan gesture can be used for various reasons including, but not limited to, moving through screens, images, or menus at a controlled rate. Multiple finger pan gestures are also contemplated.

In some configurations, the computer 800 supports a flick gesture in which a user swipes a finger in the direction the user wants the screen to move. The flick gesture can be used for various reasons including, but not limited to, scrolling horizontally or vertically through menus or pages. In some configurations, the computer 800 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as digital pens can be used to interact with the computing device 800. As such, the above gestures should be understood as being illustrative and should not be construed as being limiting in any way.

It should be appreciated that the software components described herein, when loaded into the CPU 802 and executed, can transform the CPU 802 and the overall computer 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the architecture shown in FIG. 8 for the computer 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

It should be appreciated that the computing architecture shown in FIG. 8 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1. A computer-implemented method, comprising: determining whether a foldable computing device comprising a first display region and a second display region is operating in a productivity mode; and while the foldable computing device is operating in the productivity mode, responsive to determining that a hardware keyboard has been placed over the second display region and occludes a majority of a top portion of the second display region or a software keyboard has been presented in the second display region and occludes the majority of the top portion of the second display region, presenting a user interface (UI) in the second display region below the hardware keyboard or the software keyboard, the user interface comprising a virtual trackpad and two virtual palm rejection areas.

Clause 2. The computer-implemented method of clause 1, wherein the first display region and the second display region are in a landscape orientation when the foldable computing device is operating in the productivity mode.

Clause 3. The computer-implemented method of clauses 1 or 2, further comprising: while the foldable computing device is operating in the productivity mode, responsive to determining that the hardware keyboard has been placed over the second display region and occludes a majority of a bottom portion of the second display region or the software keyboard has been presented in the second display region and occludes a majority of the bottom portion of the second display region, presenting a second user interface in the second display region above the hardware keyboard or the software keyboard.

Clause 4. The computer-implemented method of any of clauses 1-3, wherein the second user interface comprises one or more of a user interface showing an image or video, a user interface for selecting an emoji, a user interface for selecting a graphics interchange format image, or a user interface for display contents of a clipboard.

Clause 5. The computer-implemented method of any of clauses 1-4, further comprising: determining that a single UI window is displayed in the second display region when the hardware keyboard is placed over the second display region or the software keyboard is presented in the second display region; and responsive thereto, moving the single UI window from the second display region to the first display region.

Clause 6. The computer-implemented method of any of clauses 1-5, further comprising: determining that the hardware keyboard or the software keyboard no longer occlude the second display region and a windowing state of the foldable computing device remains unchanged; and responsive thereto, moving the single UI window from the first display region back to an original position of the single UI window in the second display region.

Clause 7. The computer-implemented method of any of clauses 1-6, further comprising: determining that a first UI window and a second UI window are displayed in the second display region when the hardware keyboard is placed over the second display region or the software keyboard is presented in the second display region; and responsive thereto, moving the first UI window and the second UI window from the second display region to the first display region and snapping the first UI window and the second UI window in the first display region.

Clause 8. The computer-implemented method of any of clauses 1-7, further comprising: determining that the hardware keyboard or the software keyboard no longer occlude the second display region and a windowing state remain unchanged; and responsive thereto, moving the first UI window and the second UI window from the first display region back to an original position in the second display region.

Clause 9. A non-transitory computer-readable storage medium having computer-executable instructions stored thereupon which, when executed by a foldable computing device, cause the foldable computing device to: determine that a hardware keyboard has been placed over a second display region that occludes only a top portion of the second display region or a software keyboard has been presented in the second display region that occludes only the top portion of the second display region while the foldable computing device is operating in a productivity mode; and responsive thereto, present a user interface (UI) in the second display region below the hardware keyboard or the software keyboard, the user interface comprising a virtual trackpad and two virtual palm rejection areas.

Clause 10. The non-transitory computer-readable storage medium of clause 9, wherein the first display region and the second display region are in a landscape orientation when the foldable computing device is operating in the productivity mode.

Clause 11. The non-transitory computer-readable storage medium of clauses 9 or 10, having further computer-executable instructions stored thereupon to: determine that the hardware keyboard has been placed over the second display region and occludes only a bottom portion of the second display region or the software keyboard has been presented in the second display region and occludes only the bottom portion of the second display region, and responsive thereto, present a second user interface in the second display region above the hardware keyboard or the software keyboard.

Clause 12. The non-transitory computer-readable storage medium of any of clauses 1-11, wherein the second user interface comprises one or more of a user interface showing an image or video, a user interface for selecting an emoji, a user interface for selecting a graphics interchange format image, or a user interface for displaying contents of a clipboard.

Clause 13. The non-transitory computer-readable storage medium of any of clauses 1-12, having further computer-executable instructions stored thereupon to: determine that a single UI window is displayed in the second display region when the hardware keyboard is placed over the second display region or the software keyboard is presented in the second display region; and responsive thereto, move the single UI window from the second display region to the first display region.

Clause 14. The non-transitory computer-readable storage medium of any of clauses 1-13, having further computer-executable instructions stored thereupon to: determine that the hardware keyboard or the software keyboard no longer occlude the second display region and a windowing state of the foldable computing device remains unchanged; and responsive thereto, move the single UI window from the first display region back to an original position of the single UI window in the second display region.

Clause 15. A foldable computing device, comprising: one or more processors; and at least one non-transitory computer-readable storage medium having computer-executable instructions stored thereupon which, when executed by the one or more processors, cause the foldable computing device to: determine that a hardware keyboard has been placed over a second display region that occludes only a top portion of the second display region or a software keyboard has been presented in the second display region that occludes only the top portion of the second display region while the foldable computing device is operating in a productivity mode; and responsive thereto, present a user interface (UI) in the second display region below the hardware keyboard or the software keyboard, the user interface comprising a virtual trackpad and two virtual palm rejection areas.

Clause 16. The foldable computing device of clause 15, wherein the first display region and the second display region are in a landscape orientation when the foldable computing device is operating in the productivity mode.

Clause 17. The foldable computing device of any of clauses 15 or 16, wherein the at least one non-transitory computer-readable storage medium has further computer-executable instructions stored thereupon to: determine that the hardware keyboard has been placed over the second display region and occludes only a bottom portion of the second display region or the software keyboard has been presented in the second display region and occludes only the bottom portion of the second display region, and responsive thereto, present a second user interface in the second display region above the hardware keyboard or the software keyboard.

Clause 18. The foldable computing device of any of clauses 15-17, wherein the second user interface comprises one or more of a user interface showing an image or video, a user interface for selecting an emoji, a user interface for selecting a graphics interchange format image, or a user interface for display contents of a clipboard.

Clause 19. The foldable computing device of any of clauses 15-18, wherein the at least one non-transitory computer-readable storage medium has further computer-executable instructions stored thereupon to: determine that a single UI window is displayed in the second display region when the hardware keyboard is placed over the second display region or the software keyboard is presented in the second display region; and responsive thereto, move the single UI window from the second display region to the first display region.

Clause 20. The foldable computing device of any of clauses 15-19, wherein the at least one non-transitory computer-readable storage medium has further computer-executable instructions stored thereupon to: determine that the hardware keyboard or the software keyboard no longer occlude the second display region and a windowing state of the foldable computing device remains unchanged; and responsive thereto, move the single UI window from the first display region back to an original position of the single UI window in the second display region.

Based on the foregoing, it should be appreciated that technologies for providing transitions and optimizations for a foldable computing device operating in a productivity mode have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
    determining whether a foldable computing device comprising a first display region and a second display region is operating in a productivity mode that separates the first display region and the second display region via a bend; and
    while the foldable computing device is operating in the productivity mode,
        determining (i) that a hardware keyboard has been placed over the second display region and occludes at least a portion of the second display region or (ii) that a software keyboard has been presented in the second display region and occludes at least the portion of the second display region;
        presenting a user interface in the second display region above or below the hardware keyboard or the software keyboard, the user interface comprising a virtual trackpad and two virtual palm rejection areas;
        determining that an application window, which is already displayed in the second display region when the hardware keyboard is placed over the second display region or when the software keyboard is presented in the second display region, is occluded by the hardware keyboard or the software keyboard; and
        in response to determining that the application window is occluded by the hardware keyboard or the software keyboard, moving the application window from the second display region to the first display region.

2. The computer-implemented method of claim 1, wherein the first display region and the second display region are in a landscape orientation when the foldable computing device is operating in the productivity mode.

3. The computer-implemented method of claim 1, further comprising: while the foldable computing device is operating in the productivity mode and responsive to determining that the hardware keyboard has been placed over the second display region and occludes at least the portion of the second display region or the software keyboard has been presented in the second display region and occludes at least the portion of the second display region, presenting a second user interface in the second display region above or below the hardware keyboard or the software keyboard.

4. The computer-implemented method of claim 3, wherein the second user interface comprises an image or video, an emoji, a graphics interchange format image, or contents of a clipboard.

5. The computer-implemented method of claim 1, further comprising: determining that the hardware keyboard or the software keyboard no longer occludes at least the portion of the second display region and that a windowing state of the foldable computing device remains unchanged; and responsive thereto, moving the application window from the first display region back to an original position of the application window in the second display region.

6. The computer-implemented method of claim 1, further comprising snapping the application window in the first display region.

7. A computer storage medium having computer-executable instructions stored thereupon which, when executed by a foldable computing device, cause the foldable computing device to:
   detect, using one or more sensors and while the foldable computing device is operating in a productivity mode that separates a first display region from a second display region via a bend, (i) that a hardware keyboard has been placed over the second display region and occludes at least a portion of the second display region or (ii) that a software keyboard has been presented in the second display region and occludes at least the portion of the second display region;
   determine that an application window, which is already displayed in the second display region when the hardware keyboard is placed over the second display region or when the software keyboard is presented in the second display region, is occluded by the hardware keyboard or the software keyboard; and
   in response to determining that the application window is occluded by the hardware keyboard or the software keyboard, move the application window from the second display region to the first display region.

8. The computer storage medium of claim 7, wherein the first display region and the second display region are in a landscape orientation when the foldable computing device is operating in the productivity mode.

9. The computer storage medium of claim 7, having further computer-executable instructions stored thereupon to cause the foldable computing device to present a user interface in the second display region above or below the hardware keyboard or the software keyboard.

10. The computer storage medium of claim 9, wherein the user interface comprises an image or video, an emoji, a graphics interchange format image, or contents of a clipboard.

11. The computer storage medium of claim 7, having further computer-executable instructions stored thereupon to cause the foldable computing device to: determine that the hardware keyboard or the software keyboard no longer occludes at least the portion of the second display region and that a windowing state of the foldable computing device remains unchanged; and responsive thereto, move the application window from the first display region back to an original position of the application window in the second display region.

12. A foldable computing device, comprising:
   one or more processors; and at least one computer storage medium having computer-executable instructions stored thereupon which, when executed by the one or more processors, cause the foldable computing device to:
      detect, using one or more sensors and while the foldable computing device is operating in a productivity mode that separates a first display region from a second display region via a bend, (i) that a hardware keyboard has been placed over the second display region and occludes at least a portion of the second display region or (ii) that a software keyboard has been presented in the second display region and occludes at least the portion of the second display region;
      determine that an application window, which is already displayed in the second display region when the hardware keyboard is placed over the second display region or when the software keyboard is presented in the second display region, is occluded by the hardware keyboard or the software keyboard; and
      in response to determining that the application window is occluded by the hardware keyboard or the software keyboard, move the application window from the second display region to the first display region.

13. The foldable computing device of claim 12, wherein the first display region and the second display region are in a landscape orientation when the foldable computing device is operating in the productivity mode.

14. The foldable computing device of claim 12, wherein the at least one computer storage medium has further computer-executable instructions stored thereupon to cause the foldable computing device to present a user interface in the second display region above or below the hardware keyboard or the software keyboard.

15. The foldable computing device of claim 14, wherein the user interface comprises an image or video, an emoji, a graphics interchange format image, or contents of a clipboard.

16. The foldable computing device of claim 12, wherein the at least one computer storage medium has further computer-executable instructions stored thereupon to cause the foldable computing device to:
   determine that the hardware keyboard of the software keyboard no longer occludes at least the portion of the second display region and that a windowing state of the foldable computing device remains unchanged; and
   responsive thereto, move the application window from the first display region back to an original position of the application window in the second display region.

17. The computer storage medium of claim 9, wherein the user interface comprises a virtual trackpad and two virtual palm rejection areas.

18. The foldable computing device of claim 14, wherein the user interface comprises a virtual trackpad and two virtual palm rejection areas.

* * * * *